United States Patent
Combs

(10) Patent No.: US 11,634,174 B2
(45) Date of Patent: Apr. 25, 2023

(54) COAXIAL CO-LOCATED VEHICLE DRIVE POWER AND STEERING SYSTEM

(71) Applicant: Ryan Nathaniel Combs, Poland, OH (US)

(72) Inventor: Ryan Nathaniel Combs, Poland, OH (US)

( * ) Notice: Subject to any disclaimer, the term of this patent is extended or adjusted under 35 U.S.C. 154(b) by 245 days.

(21) Appl. No.: 17/210,496

(22) Filed: Mar. 23, 2021

(65) Prior Publication Data

US 2021/0323604 A1    Oct. 21, 2021

Related U.S. Application Data

(60) Provisional application No. 63/012,145, filed on Apr. 18, 2020.

(51) Int. Cl.
| | | |
|---|---|---|
| *B62D 12/00* | (2006.01) |
| *B60K 1/00* | (2006.01) |
| *B62D 5/04* | (2006.01) |
| *F16H 57/037* | (2012.01) |
| *B62D 55/02* | (2006.01) |

(52) U.S. Cl.
CPC .............. *B62D 12/00* (2013.01); *B60K 1/00* (2013.01); *B62D 5/0403* (2013.01); *F16H 57/037* (2013.01); *B62D 55/02* (2013.01)

(58) Field of Classification Search
None
See application file for complete search history.

(56) References Cited

U.S. PATENT DOCUMENTS

| | | | | |
|---|---|---|---|---|
| 4,428,445 A | * | 1/1984 | Zaunberger | B62D 11/18 180/6.44 |
| 4,882,947 A | * | 11/1989 | Barnard | B62D 11/10 475/23 |
| 5,004,060 A | * | 4/1991 | Barbagli | B62D 55/06 475/23 |
| 5,275,248 A | * | 1/1994 | Finch | B60K 1/02 180/65.6 |

(Continued)

FOREIGN PATENT DOCUMENTS

| | | | | |
|---|---|---|---|---|
| JP | 2021113606 A | * | 8/2021 | |
| WO | WO-2016116042 A1 | * | 7/2016 | ............... F16H 3/04 |
| WO | WO-2019062864 A1 | * | 4/2019 | ............... F16H 3/04 |

*Primary Examiner* — Minnah L Seoh
*Assistant Examiner* — Ryan Edward Hardy
(74) *Attorney, Agent, or Firm* — RC Trademark Company

(57) ABSTRACT

A coaxial co-located vehicle power drive and steering system includes a motor coupled to a transmission having a drive shaft with a first portion and a second portion mechanically interlocked by a spline having corresponding meshing features extending parallel to the drive shaft longitudinal axis. A drive shaft housing enclosing at least a length of the drive shaft, the drive shaft housing including a first portion and a second portion mechanically interlocked by a spline having corresponding meshing features extending parallel to the drive shaft longitudinal axis. A distal end of the drive shaft terminating within a differential gearbox in mechanical communication with an axle. A steering system coupled to the drive shaft housing second portion, the steering system including one or more rotatable gears which cause an angular rotation of the housing in relation to the drive shaft.

11 Claims, 4 Drawing Sheets

(56) References Cited

U.S. PATENT DOCUMENTS

| | | | | |
|---|---|---|---|---|
| 5,722,501 | A * | 3/1998 | Finch | B60K 17/30 |
| | | | | 180/65.6 |
| 11,254,389 | B2 * | 2/2022 | Augustine | B62M 27/02 |
| 2004/0116228 | A1 * | 6/2004 | Thompson | B60K 7/0015 |
| | | | | 475/19 |
| 2011/0000732 | A1 * | 1/2011 | Schafer | B60K 17/342 |
| | | | | 180/9.3 |
| 2019/0039826 | A1 * | 2/2019 | Luckinbill | B25J 9/0084 |
| 2021/0061352 | A1 * | 3/2021 | Lee | B66F 9/07586 |

* cited by examiner

COAXIAL CO-LOCATED VEHICLE DRIVE POWER AND STEERING SYSTEM

CLAIM OF PRIORITY

This application claims the benefit of priority, under 35 U.S.C. 119, to U.S. Provisional Application No. 63/012,145, filed Apr. 18, 2020, and titled "SNOWMOBILE", which is hereby incorporated by reference in its entirety.

FIELD OF THE INVENTION

The present invention relates to vehicle drive power and steering systems. More specifically, to a coaxial, co-located drive power and steering system.

BACKGROUND

Conventional vehicle drive power systems include an engine coupled to a power transmission. Power from the engine is transmitted via the power transmission to cause rotation of tires, tracks, treads, etc. to move the vehicle along a surface. Steering of the vehicle is achieved by steering linkage that transfers an operator's directional instruction (imparted via steering wheel, hand paddles, foot pedals, etc.) to the vehicle's, for example, tires.

DETAILED DESCRIPTION

Figure 1:
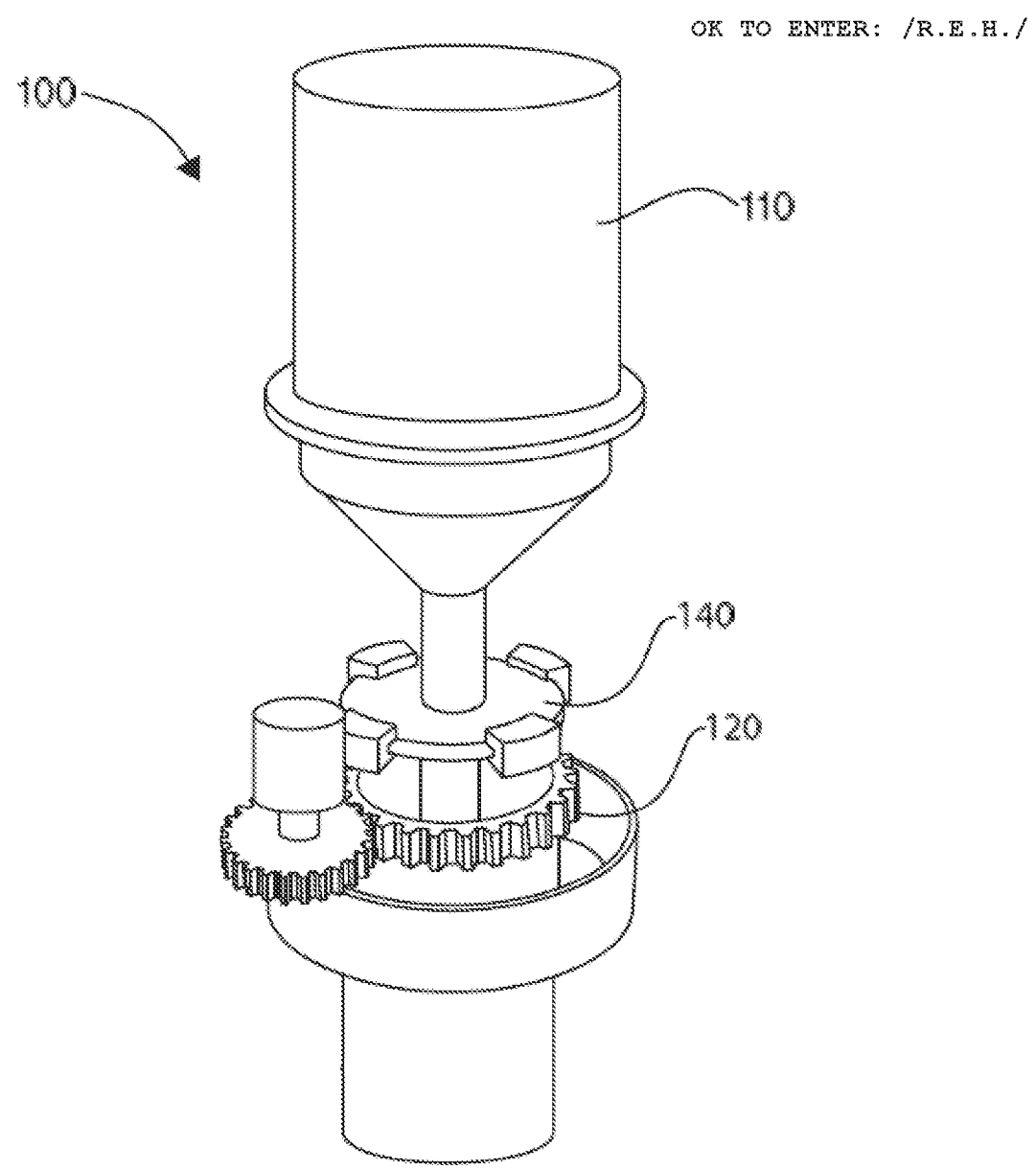
FIG. 1 depicts a perspective view of a coaxial drive power/steering system in accordance with embodiments.

Embodying systems and methods provide a vehicle drive power system and steering system located together in a coaxial configuration. FIG. 1 depicts a perspective view of coaxial mechanical drive power/steering system 100 in accordance with embodiments. The drive system 110 can include a motor and a power transmission. The drive system provides rotational motion to a two-part splined drive shaft that is located within a two-part splined housing. The steering system 120 controls rotation of the splined housing about the drive shaft longitudinal axis. Rotation of the drive shaft housing achieves steering control of the vehicle.

In accordance with embodiments, the drive shaft is coupled at an end to a differential gear box. The drive shaft rotational torque (developed about perpendicular to its longitudinal axis) is transferred by the differential gear box to a drive axle perpendicular to the drive shaft's longitudinal axis. The rotation of the drive axle causes movement of the vehicle by operation of the vehicle's propulsion system (e.g., tires, tracks, treads, or other propulsion mechanism).

In accordance with embodiments, the drive shaft housing includes an upper portion and a lower portion. The drive shaft housing lower portion is sized to be inside the drive shaft upper portion. The upper portion includes an inner surface that mates with an outer surface of the lower portion to form a spline. The spline includes ridges on one of the surfaces that mesh with grooves on the other of the surfaces. The ridges and grooves extend parallel to the longitudinal axis of the drive shaft. In accordance with embodiments, the ridges can be located on the upper portion inner surface and the grooves can be located on the lower portion outer surface.

It will be readily understood that other embodiments can include the drive shaft housing upper portion to be sized to fit inside the drive shaft housing lower portion. The location of mating ridges and grooves of the spline can be respectively be on either opposing inner and outer surfaces of the drive shaft housing portions.

In accordance with embodiments, the drive shaft can include an upper portion and a lower portion. The drive shaft upper and lower portions engaged together by a longitudinal spline formed from respective longitudinal ridges and grooves.

Figure 2:
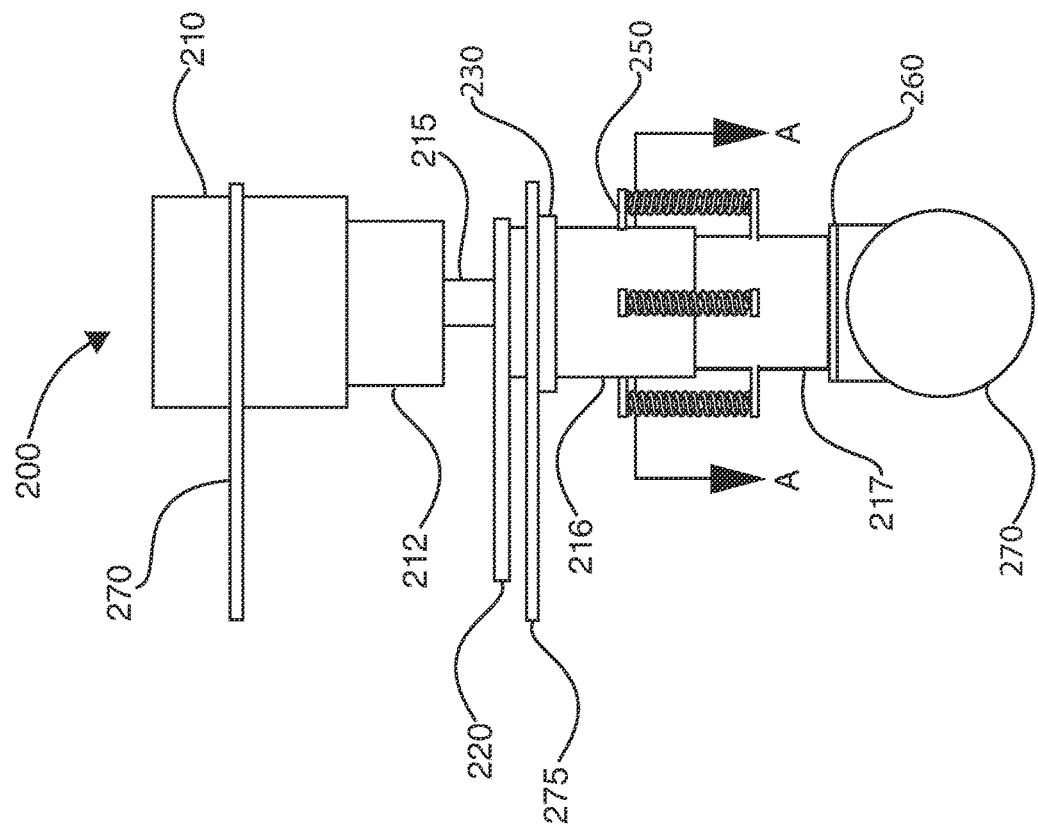
FIG. 2 depicts an elevation view of the mechanical drive power/steering system of FIG. 1 in accordance with embodiments.
Figure 2A:
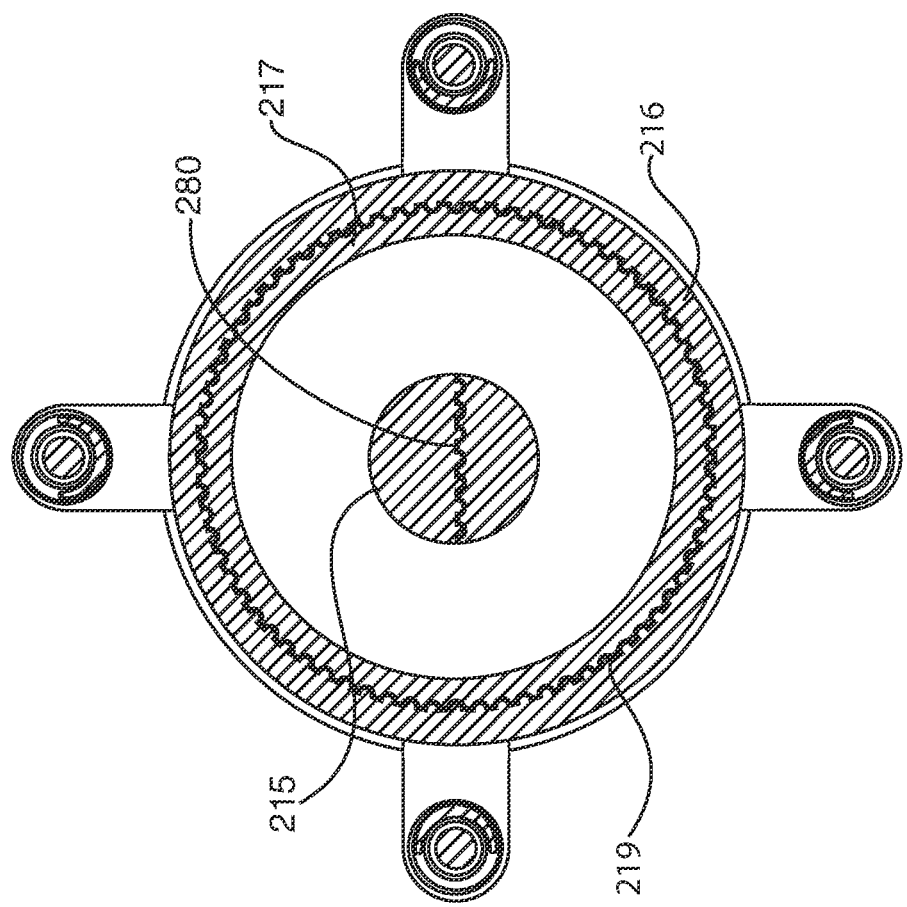
FIG. 2A depicts a cross section view of the mechanical drive power/steering system along line AA of FIG. 2 in accordance with embodiments.

FIG. 2 depicts an elevation view of coaxial mechanical drive power/steering system 200 in accordance with embodiments. Support frame member(s) 270, 275 mechanically couple coaxial mechanical drive power/steering system 200 to the vehicle. Drive system 210 can include a motor and a power transmission 212. The drive system provides rotational motion to drive shaft 215, which is at least partially located within a housing formed by drive shaft upper housing 216 and drive shaft lower housing 217. The drive shaft upper housing and drive shaft lower housing are mechanically coupled by a spline 219 (FIG. 2A) formed by corresponding meshing features (e.g., ridges and grooves) that extend parallel to the drive shaft's longitudinal axis.

In accordance with embodiments, drive shaft 215 includes an upper portion and a lower portion. The drive shaft portions are mechanically interlocked by a spline 280 extending parallel to the drive shaft's longitudinal axis.

The spline components (of both the housing and drive shaft) include longitudinal cuts at a depth to mesh with, and force against, the corresponding meshing surfaces for longitudinal, linear freedom. This meshing results in a minimum loss of torque transfer between the spline components.

At an end of the drive shaft distal from drive system 210, the drive shaft terminates within differential gear box 270. The bolt plate 260 can mechanically secure the drive shaft lower housing to the outer housing of differential gear box 270. In accordance with embodiments, differential gear box 270 provides rotational power to an axle perpendicular to the drive shaft longitudinal axis.

In accordance with embodiments, the bolt plate 260 can include two flat plates. One plate is on the drive shaft lower housing; and the other plate is on the differential gear box housing. These two plates can align and receive threaded studs and/or through bolts to secure the drive shaft lower housing and differential gear box housing together.

In accordance with embodiments, the end of the drive shaft can terminate in the differential gear box. Within the differential gear box the terminal end of the drive shaft can mesh with helical gear teeth. Axle pivot bearing housing 310 can be located at a side of differential gear box 270 that is distal from the drive shaft lower housing.

A hub for each axle can be located within the axle pivot bearing housing. A bearing within this housing can provide an amount of pivot to overcome obstacles and/or uneven terrain that might appear under the vehicle tracks when in motion. The axle can revolve with the same revolutions from the drive shaft transferred power while this configuration allows the axle to pivot on the bearing.

In accordance with embodiments, shock absorbers 250 absorb and dampen vertical motion caused by uneven surfaces transited by the vehicle. Shock absorber 250 can be any suitable shock absorbent device and/or material (e.g., (coil, leaf) springs, pneumatic, hydraulic, or other shock absorption devices). A first end of the shock absorbers is mechanically connected to an outer surface of the upper drive shaft housing 216. A second end of the shock absorbers is mechanically connected to an outer surface of the lower drive shaft housing 217.

In accordance with embodiments, bearing 230 can be fitted to support frame member 275. Drive shaft upper housing 216 can be fitted into bearing 230 so that the drive shaft housing can rotate along with the bearing about the bearing's center axis. The drive shaft passes through the bearing. The bearing's center axis being about coaxial with the drive shaft longitudinal axis. The bearing maintains a coaxial alignment between the drive shaft's longitudinal axis and the drive shaft housing center, while allowing the drive shaft to freely rotate within the drive shaft housing.

In accordance with embodiments, braking system 140 can apply frictional pressure to the drive shaft 215. Control of the braking system is provided by an operator of the vehicle. In accordance with embodiments, the motor, power transmission, and braking system can be within a drive system enclosure.

In accordance with embodiments, steering system 220 is mechanically connected to the upper housing 216. Operation of the steering system causes a rotation about the center axis of the upper housing through gear teeth that transfer the rotation to the lower housing and then to the differential gear box housing. The steering system can includes a control drive that mechanically couples to the steering system to provide bi-directional control of the direction of the upper housing rotation with a belt drive, a chain drive, gear drive or a cable drive.

The steering system can be mounted and secured adjacent to the upper housing and fastened to the support frame within a compartment above the bearing 230 to have teeth align with upper housing's teeth. In some implementations, there can be a choice of drive utility mesh to transfer torque turning both housings to turn the drive track assemblies. The steering system 220 can be supported adjacent, and towards, the top of the upper housing.

The mechanical connection between the lower housing, bolt plate 260, and differential 270 results in a rotational movement of these components about the drive shaft longitudinal axis. This rotational movement of the differential results in directional control of the vehicle. In accordance with embodiments, the rotational movement can be up to about 360°, or greater. Rotation of 180° can reverse the direction of the vehicle. In accordance with embodiments, stops or bumpers can be positioned to block the full 360° rotation to limit the rotation to about 180°.

Figure 3:
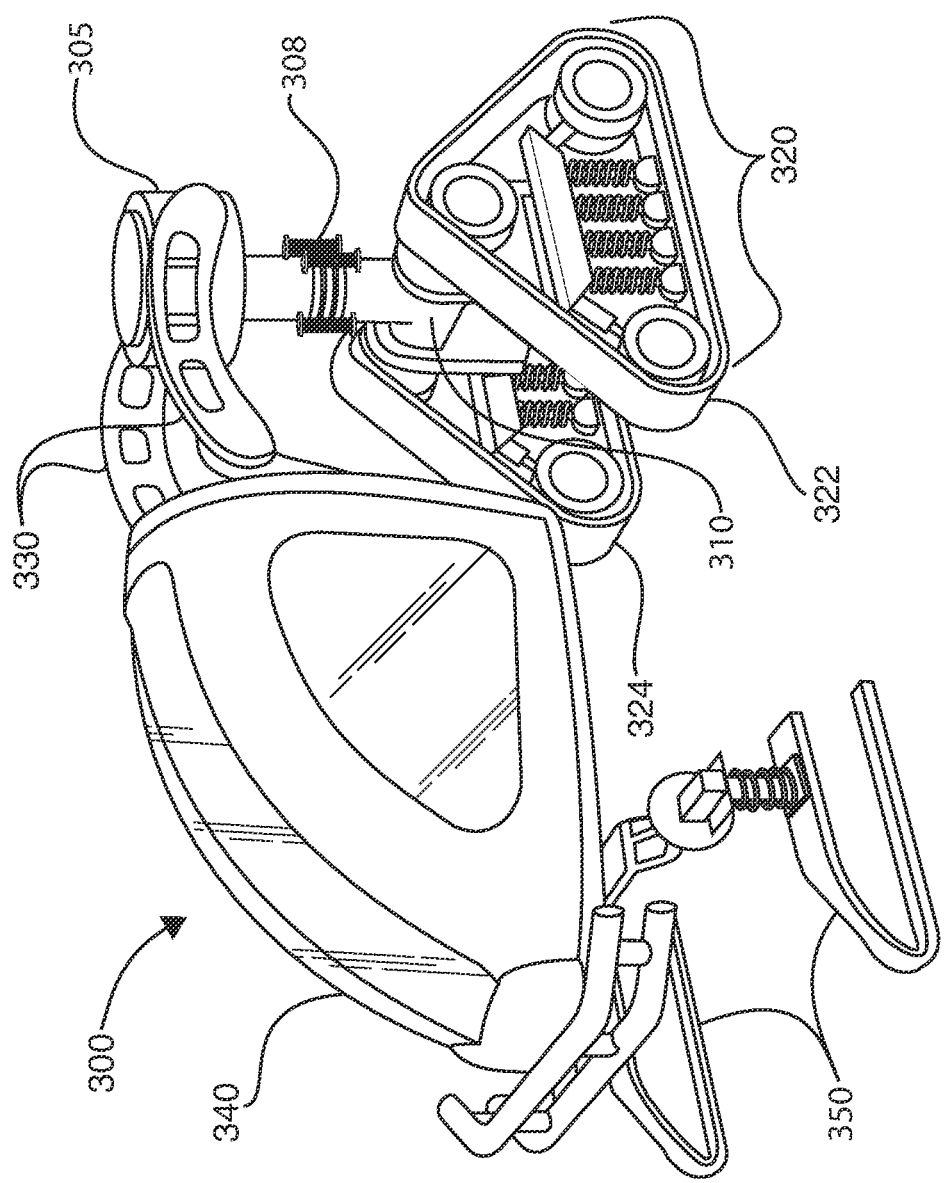
FIG. 3 depicts a perspective view of a vehicle implementing an embodiment of the mechanical drive power/steering system.

FIG. 3 depicts a perspective view of a vehicle 300 implementing an embodiment of the mechanical drive power/steering system disclosed herein. As disclosed, the vehicle includes an embodying implementation of the coaxial drive power and steering system, which includes drive system 305, splined drive shaft housing 308, and axle pivot bearing housing 310.

The differential provides power to a propulsion assembly 320 that can include drive track assemblies 322, 324. The quantity of drive track assemblies is not limited to two as depicted, but can include one or more assemblies based on load, terrain, and other performance parameters. The drive track assemblies can include shock absorber elements (e.g., (coil, leaf) springs, pneumatic, hydraulic, or other shock absorption devices). Embodiments are not so limited, and the drive track can be interchanged with wheel assemblies, pontoon floats, skid skis, etc. as determined by terrain and use.

The propulsion assembly 320 is mechanically coupled to the differential housing. Under control of steering system 220, the propulsion assembly 320 can rotate about its vertical axis 360° in either a clockwise and/or counterclockwise direction. Rotation of 180° can reverse the direction of the vehicle. In accordance with embodiments, stops or bumpers can be positioned to block the full 360° rotation to limit the rotation to about 180°.

An embodying mechanical drive power/steering system can be affixed to one or more vehicle frame members 330. The vehicle can include a passenger compartment 340 having a windshield, windows, and doors. Braking, steering, and speed controls can be located within the passenger compartment.

In some implementations the vehicle can include front skis 350. However, the front skis can be interchanged for wheel assemblies, pontoon floats, etc.

Although specific hardware configurations have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A coaxial co-located vehicle power drive and steering system comprising:
   a motor coupled to a transmission, the transmission having a drive shaft;
   the drive shaft including a first portion and a second portion;
   at least a length of the drive shaft enclosed within a drive shaft housing;
   the drive shaft housing including a first portion and a second portion;
   the drive shaft having an end distal from the transmission, the drive shaft distal end terminating within a differential gear box;
   a steering system coupled to the drive shaft housing second portion, the steering system including one or more rotatable gears, the gear rotation direction determined by a control drive;
   a housing of the differential gear box secured to the drive shaft housing second portion; and
   the differential gear box in mechanical communication with an axle, the axle positioned about perpendicular to a longitudinal axis of the drive shaft.

2. The system of claim 1, including the drive shaft first portion and the drive shaft second portion mechanically interlocked by a spline having corresponding meshing features extending parallel to a drive shaft longitudinal axis.

3. The system of claim 1, including the drive shaft housing first portion and the drive shaft second housing portion mechanically interlocked by a spline having corresponding meshing features extending parallel to a drive shaft longitudinal axis.

4. The system of claim 1, including:
a shock absorber mounted to the drive shaft housing;
the shock absorber having a first end secured to the drive shaft housing first portion; and
the shock absorber having a second end distal from the first end, the second end secured to the drive shaft housing second portion.

5. The system of claim 1, including:
the steering system configured to apply a rotational force to the drive shaft housing second portion,
the rotational force being about a longitudinal axis of the drive shaft; and
the rotational force causing an angular change in a position of an axle perpendicular to the drive shaft longitudinal axis, the angular change occurring in a plane about perpendicular to the drive shaft longitudinal axis.

6. The system of claim 5, the angular change being bidirectional.

7. The system of claim 1, including a braking system configured to provide a frictional pressure to the drive shaft.

8. The system of claim 1, including:
an axle perpendicular to a longitudinal axis of the drive shaft;
the axle receiving power transferred by the differential gear box from the drive shaft; and
the axle coupled to a vehicle propulsion system.

9. The system of claim 8, including the vehicle propulsion system including one of tires, tracks, treads, or skis.

10. The system of claim 1, including:
the coaxial co-located vehicle power drive and steering system connected to one or more frame members of a vehicle;
the vehicle including:
a vehicle propulsion system having one of tires, tracks, treads, or skis; and
a passenger compartment.

11. The system of claim 1, including:
a bearing positioned along the drive shaft in mechanical communication with the drive shaft housing;
the bearing having an aperture located at about a center of the bearing, the aperture surrounding the drive shaft; and
the bearing configured to maintain a coaxial alignment between a longitudinal axis of the drive shaft and a center of the drive shaft housing.

* * * * *